J. F. McMAHEL & S. TRACY.
Organ Stop Actions.

No. 166,214. Patented Aug. 3, 1875.

UNITED STATES PATENT OFFICE.

JAMES F. McMAHEL AND SAMUEL TRACY, OF OXFORD, OHIO.

IMPROVEMENT IN ORGAN STOP-ACTIONS.

Specification forming part of Letters Patent No. 166,214, dated August 3, 1875; application filed February 12, 1875.

*To all whom it may concern:*

Be it known that we, JAMES F. McMAHEL and SAMUEL TRACY, of Oxford, in the county of Butler and State of Ohio, have invented a new and useful Improvement in Organs; and we do hereby declare that the following is a full and exact description thereof, reference being had to the accompanying drawings and to the letters of reference marked thereon.

Figure 1:
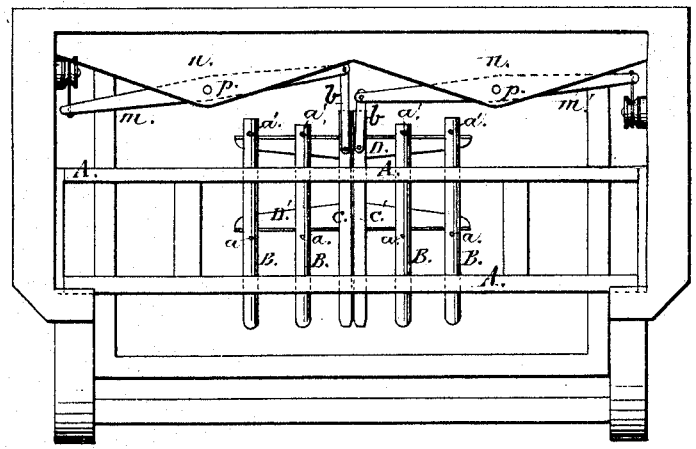
Figure 2:
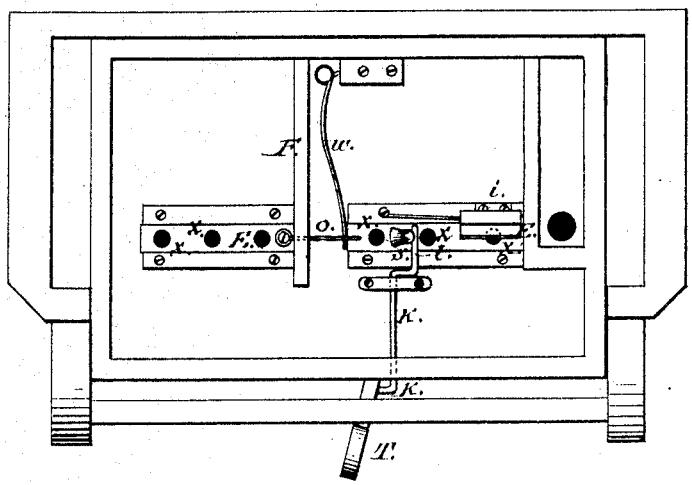
Figure 3:
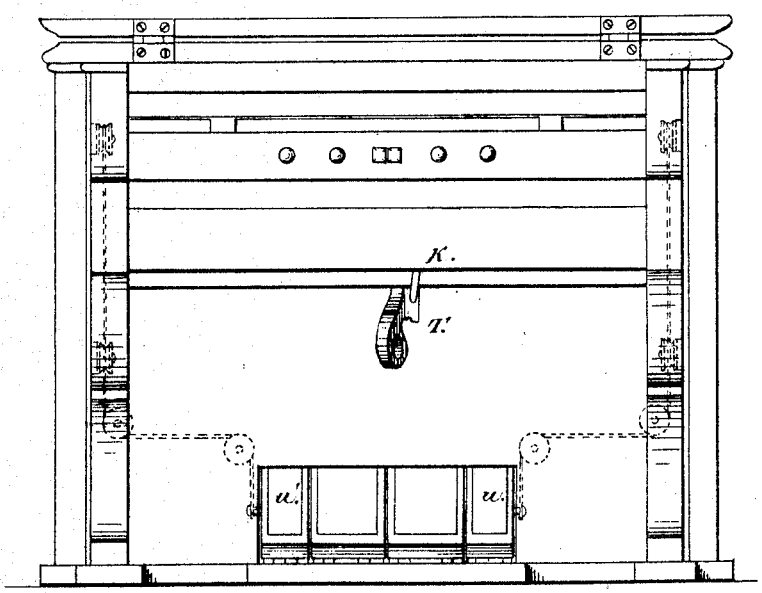

Figure 1 represents a plan or top view of the stop mechanism of an organ. Fig. 2 represents a similar view of the sliding valves in the bottom of the air-chamber, and the operating devices connected therewith. Fig. 3 represents a part of the front of the organ, and exhibits the knee-lever and the outer end of the crank-rod, which actuate the valves; also, the pedals which are connected by cords with the stop mechanism.

Our improvement relates to a new mechanism, by which the organist can throw all the stops on or off simultaneously by the use of pedals, while the mechanism is so organized as to enable the player to operate each of the stops independently by hand; also, so that either of the stops may be operated independently to be thrown off by hand, and all the stops may be thrown on simultaneously by a pedal, to permit all the reeds of the instrument to vibrate, and thereby avail of the full power of the organ; and our invention further consists in a new arrangement of mechanism by the operation of which an echo may be produced.

This branch of our invention involves the use of cut-off valves or slides, which can be actuated by a knee-lever to close the air-passages from the air-chamber to the bellows. These air-passages may be simultaneously closed or partly closed to any desired extent by the lateral movement of the knee of the organist. The closing of the air-passages may be so performed as to gradually diminish and soften the tones, or they may be so gradually opened as to produce the reverse effect of increasing the volume of sound. By cutting off or closing the air-passage momentarily, and then permitting them to open slightly, the effect upon the reeds of the instrument will be the production of the echo. Above the air-chamber the frame A, which extends across the front portion of the organ, is provided with round holes, through which a row of stop-shanks, B, is inserted, and centrally through this frame two slides, C C', are placed. The slide C' has fastened to its under side the cross-piece D, and the slide C has a like cross-piece, D', fastened to its under side. Each of the stop-shanks B has two pins, $a$ $a'$, inserted through it, and projecting below it, so as to be acted upon by the cross-pieces D D'. To the rear ends of slides C C' couplings $b$ $b$ are connected by pivots, and the opposite ends of the couplings are pivoted to the inner ends of levers $m$ $m'$. Levers $m$ $m'$ work on central vertical pivots $p$ $p$, fastening them to supports $n$ $n$, which are secured to and project inwardly from the rear of the organ-case. The outer ends of levers $m$ $m'$ are connected, by cords passing around pulleys, with pedals $u$ $u'$ in front of the organ-case. The pedal $u$ will, through its cord, act upon lever $m'$, which draws slide C' rearward with its cross-piece D, and the latter will act against pins $a'$ and move all the stops B rearward. The pedal $u'$ acts through its connecting-cord upon lever $m$, which causes cross-piece D', attached to slide C, to act against pins $a$, and slide the stop-shanks B toward the front of the organ. The pins $a$ $a'$ extend down below the stop-shanks B, so as to be acted upon by the cross-pieces D D', as specified. The stops are free to be operated separately by the organist. The echo-valves E consist of slides located on the bottom or floor of the air-chamber. One of these slides is on each side of the partition F; but they are connected by a wire, $o$, so as to be moved simultaneously when acted upon by the crank-rod K, which extends to the front of the organ-case, and is bent downward. The crank-arm $l$ of rod K extends over one of the sliding valves E, from which the stud S projects upward, and against which the crank-arm $l$ works to slide the valves E, to close the holes $x$, which communicate with similar holes in the bottom of the air-chamber. The lever T is hinged to the front of the organ-case at a proper elevation to be operated by the player's knee, and this lever, when moved laterally, acts upon the bent projecting end of rod K, which causes the crank-arm $l$ to act against stud S, which moves the sliding valves E laterally, and closes the air-passages leading from the bellows to the air-chamber. A retracting-spring, W, acts upon valves E to cause them to return and open the air-passages when the knee-lever T is released.

It will be understood that the mechanism for graduating and controlling the volume of sound works harmoniously, and in combination with the mechanism which is used to actuate the stops, the former serving to govern the quantity of air forced through the air-chamber, while the latter determines the number of reeds to be used, at the option of the player.

By our improved mechanism for graduating the volume of air admitted to the chamber the most accurate accentuation of music may be produced, and either gradual swells or sudden explosive tones may be caused, thus enabling the musician to execute pieces of music with peculiar emphasis and force. Tremolo-valves may be combined with our sliding valves E, as represented at $i$, Fig. 2.

We claim, and desire to secure by Letters Patent, as our invention—

1. The combination of the stop-operating mechanism C C', D D', $m$ $m'$, arranged and connected with pedals $u$ $u'$, as described, for the purpose specified.

2. The valves E, in combination with crank-rod K, hinged knee-lever T, and spring W, arranged as described, for the purpose specified.

Witness our hands this 2d day of January, 1874.

JAMES F. McMAHEL.
SAML. TRACY.

Witnesses:
H. P. K. PECK,
W. O. PECK.